(12) United States Patent  
Hernandez

(10) Patent No.: US 7,429,211 B2
(45) Date of Patent: Sep. 30, 2008

(54) FISH SCALER

(76) Inventor: Ulises Hernandez, 4531 NW. 2nd St., Miami, FL (US) 33126

( * ) Notice: Subject to any disclaimer, the term of this patent is extended or adjusted under 35 U.S.C. 154(b) by 0 days.

(21) Appl. No.: 11/386,524

(22) Filed: Mar. 22, 2006

(65) Prior Publication Data

US 2007/0254575 A1 Nov. 1, 2007

(51) Int. Cl.
*A22B 5/10* (2006.01)
(52) U.S. Cl. .................................... 452/102
(58) Field of Classification Search .......... 452/1–6, 452/102–105; 30/164.9, 337, 293, 294
See application file for complete search history.

(56) References Cited

U.S. PATENT DOCUMENTS

| | | | | |
|---|---|---|---|---|
| 1,028,736 A | * | 6/1912 | Kell | 452/105 |
| 2,510,371 A | * | 6/1950 | Blatt | 452/105 |
| 2,618,011 A | * | 11/1952 | Wunderlich | 452/105 |
| 5,232,395 A | * | 8/1993 | Rushing | 452/105 |
| 5,479,674 A | * | 1/1996 | Gilcrest | 15/161 |
| 6,997,796 B1 | * | 2/2006 | Wangler | 452/102 |

* cited by examiner

*Primary Examiner*—Thomas Price
(74) *Attorney, Agent, or Firm*—Michael C. Cesarano; Feldman Gale P.A.

(57) ABSTRACT

An improved fish scaler has a bottom surface to which are affixed a plurality of downward facing scraping points, a handle attached to the bottom surface, and a protective shield extending radially outwardly from the bottom surface beyond the outermost of the scraping points such that, when the fish is grasped for scaling, the protective shield will come into contact with the grasping hand before the protruding points contact the hand, thereby avoiding injury to the hand.

13 Claims, 1 Drawing Sheet

FISH SCALER

BACKGROUND OF INVENTION

Fish scalers are mechanical devices used to remove scales from fish prior to cleaning and preparing for cooking. Fish scalers are manually operated in a reciprocating motion parallel to the surface of a fish whose scales are being removed. Scalers typically have a number of sharp protrusions or points that are raked along the outer skin of a fish in a direction opposite to the direction of growth or attachment of the scales. The points catch the external edges of the scales and pull or force them to become detached from the skin of the fish.

Newly caught fish are frequently wet or slippery from having been in the water. In addition, when the fish are scaled after returning to the dock, water is frequently used as a rinsing agent during the process of cleaning the fish, to wash away the scales and other tissue that may be removed during the cleaning process. Because the skin of the fish is slippery, it is necessary to grasp the fish firmly, and to hold it tightly, during the scaling process. If heavy duty gloves are not used, it is possible for the person doing the scaling to nick, catch, abrade, or otherwise injure the hand that is holding the fish with the sharp points of the scaler.

SUMMARY OF THE INVENTION

This invention avoids the injuries that can occur when a fish scaler inadvertently comes into contact with the hand holding the fish during a scaling operation. The fish scaler of this invention has a generally planar bottom surface forming an area from which a plurality of individual scraping points protrude downwardly in a more or less perpendicular direction. In some embodiments, the bottom surface may have a slight convex curvature, but not so great that a majority of the scraping points will not come into contact with the fish during each stroke of the scaler. The bottom surface extends horizontally outward beyond the outermost scraping points in at least a forward and backward direction with respect to the direction of movement of the scaler to form a protective boundary in at least the directions of movement of the scaler. The outermost extremities of the protective structure will be curved or angled upwardly near the edges to present a blunt, smooth surface to any object with which it may come into contact during the scaling operation. The protective structure extends outward to a sufficient distance that it will contact any object within the path of the scaler, and either push the object away or halt the movement of the scaler before any scraping points can strike the object.

When a person scaling fish is holding the fish in one hand and using the scaler in the other, if the scaler should strike the hand, the protective structure will come into contact with the hand while the points of the scaler are still an inch or two from contacting the hand. The curved outer edge of the protective structure will contact the hand, but will not catch, abrade, or otherwise injure the contacted region. The protective structure also serves to keep scales and other tissue away from the handle of the person using the scaler, thus assisting that person to keep a firm grip on the scaler.

It is an object of this invention to provide a fish scaler that can be used to scale fish without causing injury or abrasion to the hand that is holding the fish. It is another object of this invention to provide a fish scaler with a protective structure that will keep fish scales and any other slippery matter away from the handle of the scaler and from the hand that is operating the scaler, thus enabling the person who is scaling the fish to have a sturdy grip upon the fish scaler. It is a further object of this invention to provide a lightweight fish scaler that can float if dropped into the water. It is yet another object of this invention to provide an inexpensive and easily manufactured fish scaler having no more than two pieces to be assembled. These and other objects of the invention will be more fully explained in the following descriptions.

DETAILED DESCRIPTION OF THE PREFERRED EMBODIMENTS

Figure 1:
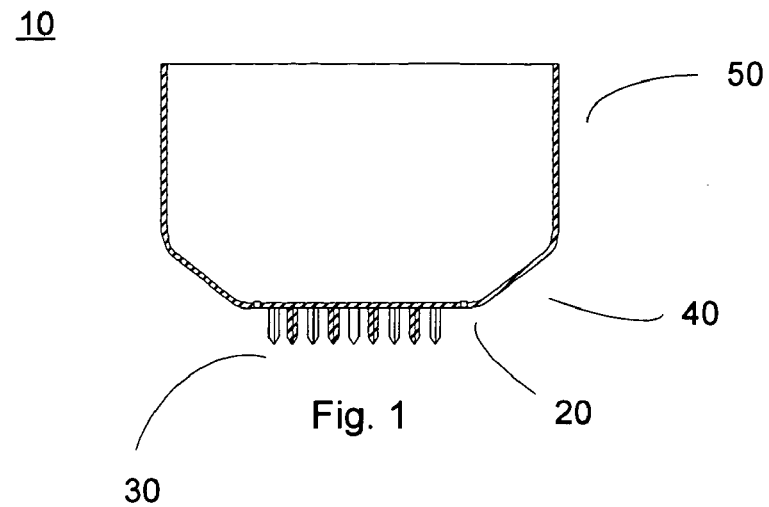
FIG. 1 is a sectional elevational view of the fish scaler of this invention taken along lines A-A' in FIG. 2.

As shown in FIG. 1, the fish scaler of this invention 10 can be manufactured using plastic injection molding to form a single shell having a plurality of integrally formed scraping points 30 protruding at approximately right angles from a bottom surface area 20. A generally flat surface 20 provides support for the scraping points, and may have a circular area within which the scraping points form a pattern. The edges of the circular area bend or curve upward to form a protective shield 40 extending around the bottom surface area. The protective shield 40 has a smooth outer surface to avoid abrading any other surfaces with which it comes into contact. At its extreme edge, protective shield 40 bends upwardly to form a vertical, cylindrical wall 50, also having a smooth outer surface. Cylindrical wall 50 protects the hand and fingers that are grasping the fish scaler from being knocked or rapped during the back and forth movement of the scaler when in use. Protective shield 40 will come into first contact with any other object, such as a hand or fingers, as the scaler is moved back and forth or in some other pattern of movement.

Figure 2:
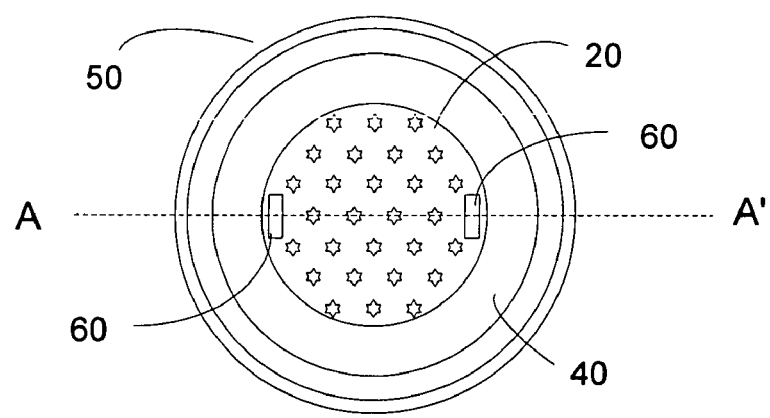
FIG. 2 is a plan view of the fish scaler of this invention as seen from below.

In FIG. 2, a pattern may be discerned in the placement of scraping points 30. Although a pattern is shown in FIG. 2, this is not a necessary feature, and a random scattering of scraping points 30 across bottom surface 20 would produce satisfactory results. The scraping points will preferably be integrally molded into the shell of the fish scaler, and can be formed with the shell as a contiguous structure of molded plastic. Alternatively, the scraping points may be installed at a later time using any one of a number of conventional methods of attachment, such as nails, screws, epoxy or glue, or the like. Rectangular mounting slots 60 are shown in FIG. 2, and provide attachment means for a handle. In a preferred embodiment, a handle (shown in FIG. 3) will have interlocking tabs that fit snugly into mounting slots 60. Other attachment means may be used, however, including a press-fit, a fused connection between contacting surfaces, glue or epoxy, or any other suitable fastening means.

Figure 3:
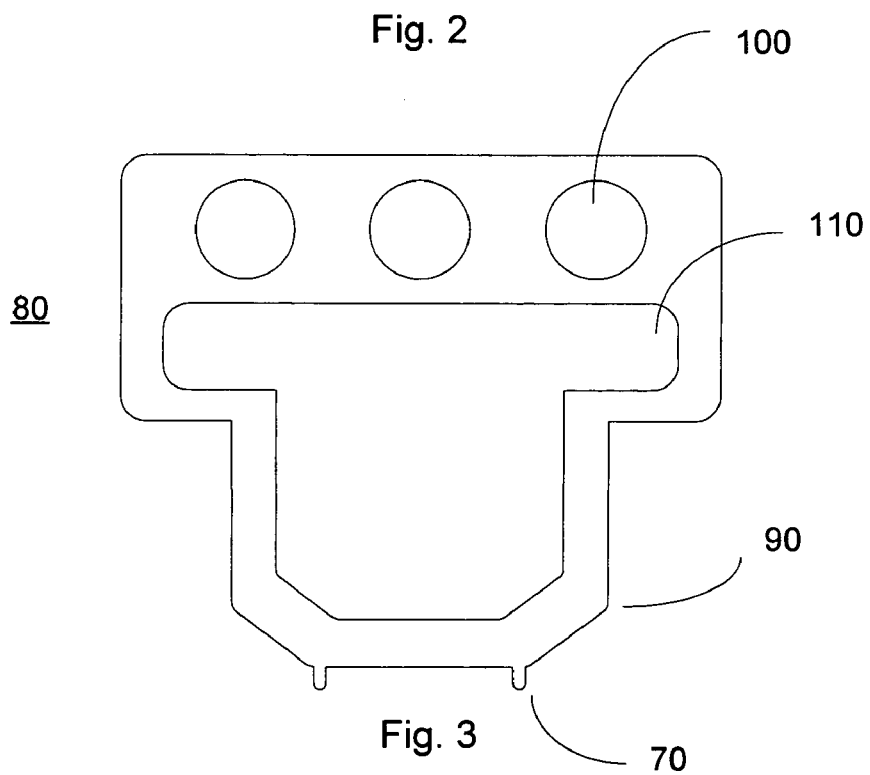
FIG. 3 is an elevational view of a handle of the fish scaler of this invention.

FIG. 3 shows a configuration for a handle 80. Tabs 70 are configured to fit into rectangular slots 60 and will hold the handle 80 securely within the shell. To prevent wiggling or looseness, handle 80 is shaped to conform to the inner surfaces of shell 10, and to resist forces that might tend to separate the handle from the shell. To ensure a lightweight handle, area 110 is an open area that may receive the fingers of a hand to permit a closed-fist like grip on the scaler. Alternatively, finger holes 100 will permit the handle to be grasped by extending the fingers through the handle. In one embodiment, the handle is wide enough so that a human hand can grasp it through the openings in the handle.

The fish scaler of this invention may be made from any suitable material, and is particularly well suited for an injection molding process. Through the use of low density or ABS nylon or other synthetic material, the fish scaler may be made with sufficient buoyancy to float if inadvertently dropped into water. Alternatively, if strength and rigidity are desirable, the fish scaler may be made from aluminum or some other suitable metal or combination of materials.

Although the invention has been described with reference to the preferred embodiments, it will be appreciated that the invention is not limited to such embodiments, but is limited only by the scope of claims appended hereto.

I claim:

1. A fish scaler comprising:
A bottom surface to which are affixed a plurality of spikes, said bottom surface forming the lowermost part of an outer shell;
a handle above said bottom surface, said handle having an upper and a lower portion, said lower portion being substantially situated within said outer shell;
said outer shell having a smooth outer surface extending outwardly from said plurality of spikes and upwardly from said bottom surface to form an outer shield,
said outer shield being configured such that, when said scaler is being used, said outer shield will impact an object in the path of said scaler before one or more of said plurality of spikes will impact such object.

2. A fish scaler as claimed in claim 1 wherein said upper portion of said handle has a width that is sufficient to receive the fingers of a human hand.

3. A fish scaler as claimed in claim 1, said shell being disposed circumferentially around said bottom portion of said handle.

4. A fish scaler as claimed in claim 1, said fish scaler further comprising a cylindrical surface at the about the periphery of said shell.

5. A fish scaler as claimed in claim 1, said shell and said handle being separate components attachable by inserting tabs on said handle into slots in said shell.

6. A fish scaler comprising an outer shell, a plurality of spikes, and a handle; said outer shell further comprising a substantially circular bottom surface; said plurality of spikes being situated on and protruding from said bottom surface; said outer shell extending circumferentially around said bottom surface and extending radially beyond the outermost of said plurality of spikes; the surface of said protective shell curving away from said bottom surface near the outermost periphery of said protective shell, said outermost periphery being circumferential, said handle having an upper and a lower portion, said lower portion being situated within said outer shell and being attached to said bottom surface on the side opposite to said spikes said outermost circumference of said outer shell being spaced apart from said plurality of spikes sufficiently that, when said scaler is being used, said outer shell will contact an object in the path of said scaler before any one of said plurality of spikes comes into contact with the object.

7. A fish scaler as claimed in claim 6, the upper portion of said handle further comprising one or more open spaces within said handle, said one or more open spaces being formed to receive the fingers of a hand and to permit said handle to be grasped within a closed fist when fingers are extended through said one or more open spaces.

8. A fish scaler as claim in claim 6, said fish scaler comprising a nylon composition and having sufficient buoyancy to float in water.

9. A fish scaler as claimed in claim 6, said outer shell, said plurality of spikes, said substantially circular bottom surface, and said protective shell comprising a continuous, integral first part, said handle comprising a continuous second part, said first and second parts being configured to fit together snugly to form a secure assembly.

10. A fish scaler comprising an outer cylindrical surface, a peripheral protective shell below said outer cylindrical surface, a bottom surface, a plurality of spikes, and a handle, said peripheral protective shell being spaced apart from said plurality of spikes and configured to protect an object in the path of said scaler from coming into contact with said plurality of spikes.

11. A fish scaler as claimed in claim 10 wherein said outer cylindrical surface, said peripheral protective shell and said bottom surface comprise a smooth and continuous outer surface, and said spikes are perpendicularly attached to said bottom surface.

12. A fish scaler as claimed in claim 10, further comprising said handle being detachable.

13. A fish scaler as claimed in claim 10 further comprising said peripheral protective shell extending radially outwardly beyond said bottom surface.

* * * * *